United States Patent [19] | [11] 4,027,165
Jacobs | [45] May 31, 1977

[54] IONIZATION DETECTION SYSTEM FOR AEROSOLS

[75] Inventor: Martin E. Jacobs, Chillicothe, Ohio

[73] Assignee: The United States of America as represented by the United States Energy Research and Development Administration, Washington, D.C.

[22] Filed: Feb. 17, 1976

[21] Appl. No.: 658,807

[52] U.S. Cl. .......................... 250/381; 340/237 S
[51] Int. Cl.[2] .......................... G01T 1/18
[58] Field of Search .......... 250/381, 375, 384, 385, 250/389, 393; 340/237 S

[56] References Cited

UNITED STATES PATENTS

| | | | |
|---|---|---|---|
| 2,994,768 | 8/1961 | Derfler | 250/375 |
| 3,158,028 | 11/1964 | Chope | 250/393 X |
| 3,223,842 | 12/1965 | Hyde | 250/384 |
| 3,235,858 | 2/1966 | Mäder | 340/237 S X |

*Primary Examiner*—Archie R. Borchelt
*Attorney, Agent, or Firm*—Dean E. Carlson; David S. Zachry; Fred O. Lewis

[57] ABSTRACT

This invention relates to an improved smoke-detection system of the ionization-chamber type. In the preferred embodiment, the system utilizes a conventional detector head comprising a measuring ionization chamber, a reference ionization chamber, and a normally non-conductive gas triode for discharging when a threshold concentration of airborne particulates is present in the measuring chamber. The improved system utilizes a measuring ionization chamber which is modified to minimize false alarms and reductions in sensitivity resulting from changes in ambient temperature. In the preferred form of the modification, an annular radiation shield is mounted about the usual radiation source provided to effect ionization in the measuring chamber. The shield is supported by a bimetallic strip which flexes in response to changes in ambient temperature, moving the shield relative to the source so as to vary the radiative area of the source in a manner offsetting temperature-induced variations in the sensitivity of the chamber.

8 Claims, 7 Drawing Figures

IONIZATION DETECTION SYSTEM FOR AEROSOLS

This invention was made in the course of, or under, a contract with Energy Research and Development Administration.

BACKGROUND OF THE INVENTION

This invention relates broadly to ionization-chamber smoke detectors, or detectors of colloidally suspended particulates in a gas, and more particularly to an improved smoke-detection system utilizing one or more such detectors.

Referring to FIG. 1, smoke-detections systems of the ionizatiion-chamber type commonly include two ionization chambers 1 and 3 which are connected in series across a d.c. voltage supply 5. Each chamber includes a pair of spaced electrodes 7 and 9 for establishing an electric field therebetween. The detector chamber 1 is open to atmosphere, whereas the reference chamber 3 contains air but is virtually sealed from atmosphere. As shown, each chamber is provided with at least one radioactive source 11 (chamber 1) and 11' (chamber 3) for ionizing air molecules therein, the resulting ions being attracted toward the chamber electrodes. As a result, a very small ionic current flows through the external circuit connecting the electrodes of the chamber. An increase in the number of visible or invisible particles in the air being sampled by the chamber 1 causes a decrease in its ionic current.

In the particular conventional detector shown in FIG. 1, the radiation source 11 for the atmospheric detector 1 is an alpha source of annular configuration. The source is mounted about the upper end of a support rod 6 as shown. For calibration purposes, a radiation absorber 10 in the form of a flanged cap is mounted to the upper end of the support rod. The cap is movable axially of the rod, the during calibration of the detector it is moved to a position where its flange intercepts and absorbs a selected fraction of the radiation which otherwise would penetrate the ionization region 14.

Whereas the measuring chamber 1 is operated in the ionically unsaturated state, the reference chamber 3 is operated in the saturated state and constitutes a constant-current device having a very high dynamic resistance. Thus, a decrease in the ionization current through the detector chamber 1 produces a relatively large voltage change at the junction 13 of the chambers. A gas triode 6 is connected across the chambers, with its starter electrode 17 connected to the junction 13 and its cathode connected to the negative electrode of detector 1. The triode normally is in the non-conductive state, but if the number of particles in the detector chamber increases to a so-called threshold value, the voltage across the chamber increases to a value exceeding the triggering, or breakdown, voltage for the cathode-to-starter-electrode portion of the triode. This initiates a cathode-to-starter current, which in turn initiates a relatively heavy discharge between the cathode and anode of the tube. This discharge energizes an alarm relay 25, which in turn energizes an alarm 22. A normally closed reset switch 23 is provided for opening the anode circuit, thus returning the triode to the non-conductive state and resetting the detector system. The ionization chambers 1, 3 and the triode commonly are designed as a compact assembly, or "detector head."

A smoke-detection system of the kind described above is subject to the disadvantage that its sensitivity to particles varies with ambient temperature. For example, tests conducted with a commercial detector head of the kind illustrated in FIG. 1 show that it incurs a total loss of sensitivity if the ambient temperature increases 10° to 25° F above the value for which it was calibrated and that it generates false alarms if its temperature decreases more than 10° F below the calibrated value. The detector head can be re-calibrated for operation at a different temperature by manually adjusting the source cap 10, but this not only is time-consuming but also is impractical if frequent re-calibration is required.

Detectors of the kind described can be rendered relatively insensitive to changes in ambient temperature by means of electronic compensation circuits. Alternatively, the effect of temperature-induced variations can be offset by means of circuitry utilizing a computer, as described in copending co-assinged U.S. patent application Ser. No. 643,466, filed on Dec. 22, 1976. However, the prior art temperature-compensation techniques are not as simple and inexpensive as desired.

SUMMARY OF THE INVENTION

It is, therefore, an object of this invention to provide an improved aerosol detector system of the ionization-chamber type.

It is another object to provide novel temperature-compensating means for the measuring ionization chamber of such a system.

It is another object to provide mechanical means for stabilizing the sensitivity of such a measuring ionization chamber over a relatively wide range of ambient temperatures.

Other objects will be made evident hereinafter.

This invention can be summarized as follows: In a system for detecting colloidally suspended particles in a gas, said system including a measuring ionization chamber having a pair of spaced electrodes for establishing an electric field therebetween, a source of radiation for ionizing molecules of said gas, and a first radiation shield positioned in partial overlap with said source for preventing part of said radiation from penetrating said region, the improvement comprising a second radiation shield mounted between said first shield and said region, and means responsive to changes in ambient temperature for supporting the second shield and moving the same relative to the first shield to offset temperature-induced variations in the sensitivity of said chamber.

DESCRIPTION OF THE PREFERRED EMBODIMENT

Figure 2:
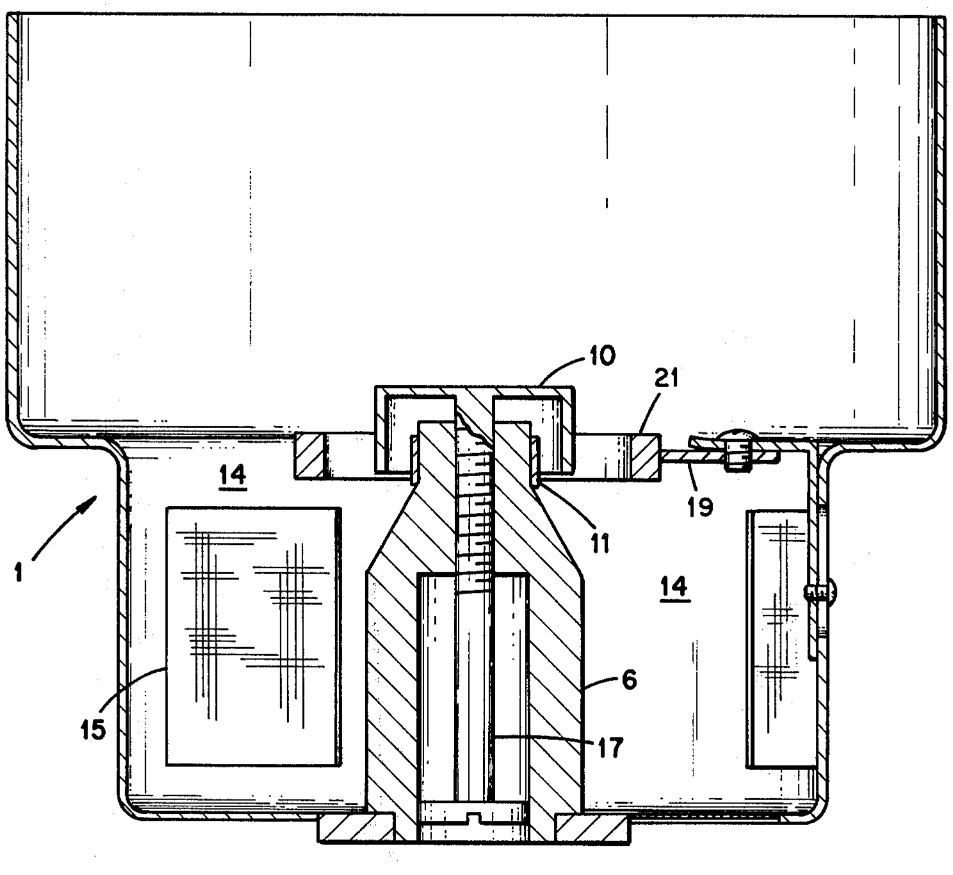
FIG. 2 is a longitudinal sectional view of the lower portion of the measuring chamber 1 as modified in accordance with this invention.

Referring to FIG. 2, a conventional measuring ionization chamber typically is in the form of a current-conductive cylinder which serves as the electrode 9 of the chamber. As shown, the lower portion of the chamber incorporates grids 15 or screens providing ready access for ambient air. The aforementioned support rod 6 for the radiation source 11 (typically an alpha source) extends upwardly from the center of the base of the chamber and is traversed axially by a threaded pin 17 whose upper end carries the source cap 10. The lower end of the pin is accessible from outside the chamber to permit manual adjustment of the cap during calibration of the chamber. As indicated, normally the flange of the cap partially overlaps the source 11.

In accordance with this invention, a conventional bimetallic strip 19 is secured at one end to the wall of the chamber 1. The other end of the strip is affixed to an annular radiation shield 21 which freely encompasses the upper end of the rod-and-cap assembly 6, 10. (For clarity, the spacing between the assembly and the shield is exaggerated in FIG. 2) As shown, the shield 21 normally is in partial overlapping relation with both the cap 10 and the portion of the source 11 not covered by the cap. That is, the shield 21 is positioned so that only a portion thereof intercepts and absorbs a selected portion of the radiation emitted by the source. The portion so absorbed is, of course, prevented from penetrating the ionization region 14.

Preferably, the bimetallic strip, or support arm, 19 is supported so that its flex length can be adjusted conveniently. If desired, the strip may be secured to the chamber by a slotted bracket or any other suitable means for facilitating vertical adjustment of the shield-and-strip assembly. The shield 21 may be composed of any suitable radiation-absorbing material. If, for example, the measuring ionization chamber is a Pyr-A-Larm Model FDU-3/5A (Pyrotronics, Inc., Cedar Knolls, N.J.), the shield may be formed from a brass ring having a thickness of three thirty-seconds inch and having an outside diameter of five sixteenths inch, thus providing an as-calibrated spacing of one thirty-second inch betweeen the shield and the source 11. The bimetallic strip may be of standard design and composition. It may, for example, be a 1 5/16 inch-long section of a 0.016 inch-thick copper-invar Bimetallic Compensator, Part 58P79, manufactured by Taylor Instrument Process Controls, Rochester N.Y.

The shield may be affixed to the strip in any suitable fashion, as by silver-brazing.

Figure 1:
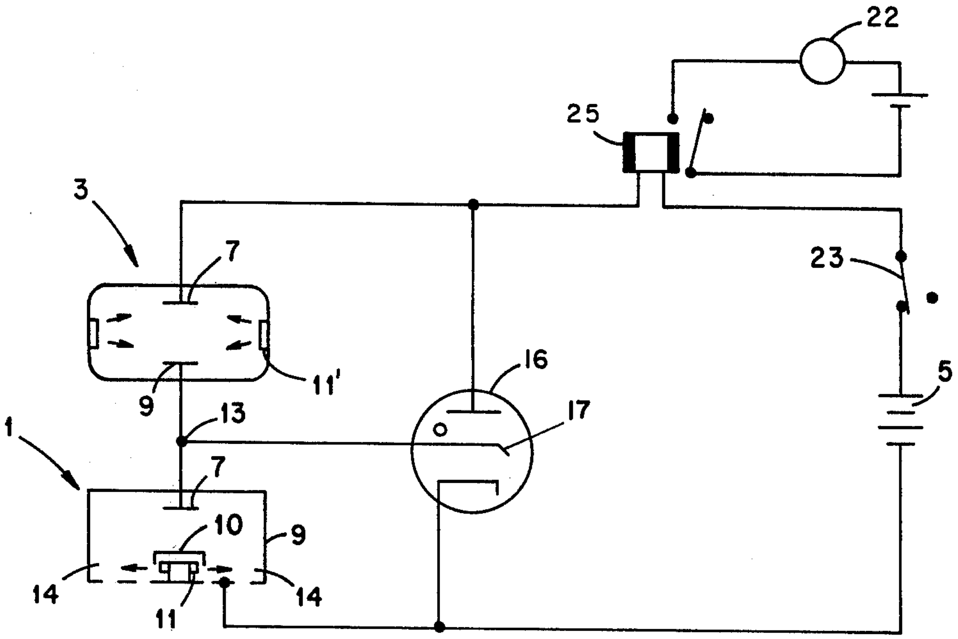
PRIOR ART Fig. 1
FIG. 1 is a schematic diagram of a conventional aerosol detection system including a meausuring ionization chamber 1 and a reference ionization chamber 3.
Figure 3:
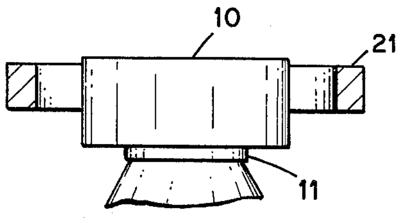
FIGS. 3, 4 and 5 are schematic diagrams illustrating, in exaggerated form, various positions of a shielding ring 21 relative to a source cap 10.
Figure 4:
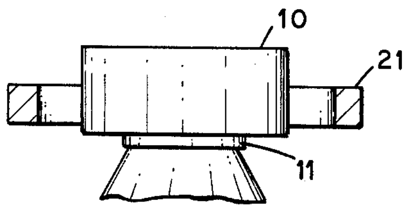
Figure 5:
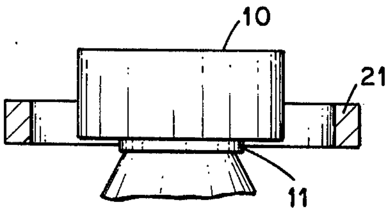

In a typical calibration of the detector, the shield-and-strip assemby 19, 21 first is set manually in a position where it has no effect on the alarm point of the aerosol detector system, following which the source cap 10 is adjusted to actuate the alarm 21 (FIG. 1) with the chamber at room temperature. The source cap 10 is then positioned manually to increase the measuring chamber sensitivity to the maximum value consistent with stable operations. (See FIG. 3) Following this adjustment, the shield-and-strip assembly is mounted in a position where the shield 21 has only a slight effect on chamber sensitivity at room temperature (e.g., in a position where rotation of the source cap through 90° re-established maximum sensitivity). (See FIG. 4) The measuring chamber now is heated to a temperature equivalent to the highest anticipated ambient temperature. With the chamber so heated, the flex-length of the strip 19 is adjusted manually to a value providing the above-mentioned maximum sensitivity. Thereafter, the strip flexes slightly with changes in ambient temperature to move the shield 21 in a generally axial direction to offset incipient temperature-induced variations in the sensitivity of the measuring chamber. That is, the bimetallic strip responds to increases in ambient temperature by moving the shield 21 downward to mask a larger portion of the source 11 and thus reduce the amount of radiation penetrating the region 14, as indicated in FIG. 5; similarly, the strip responds to decreases in ambient temperature by moving the shield upward to expose a larger fraction of the source. Thus, the shield-and-strip assembly varies the amount of radiation effective in the ionization region 14 and operates as an ionization stabilizer.

I do not wish to be bound by any particular theory as to why my invention accomplishes temperature compensation. However, it is my opinion that as the ambient temperature changes (e.g., increases), the activity of the ions increases. As a result of their increases activity ions are more diffuse and moe recombinations occur; thus the resistance of the chamber increases. This effect is offset by movement of the shield 21 to a position where less radiation from the source is admitted to the ionization region 14.

Figure 6:
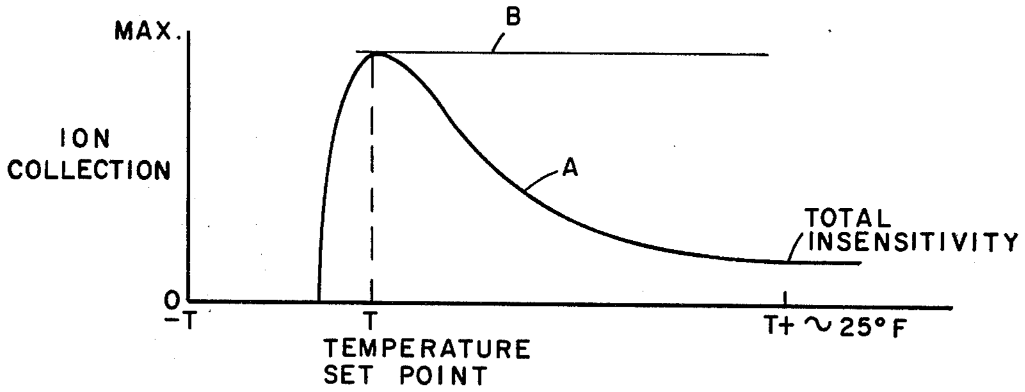
FIG. 6 is a graph comparing the temperature-to-ion collection characteristics of a conventional aerosol detector (curve A) and an aerosol detector modified as shown in FIG. 2 (curve B)

A rise in temperature for a given setting of the source cap (in FIG. 1) tends to diffuse the ion beam from less sensitive to total insensitivity. A lowering temperature from that setting of the source cap tends to increase the sensitivity, to instability, and eventually to continuous alarm, —i.e., zero ion collection. Thus it appears that the most sensitive, stable operating range for the geometrical configuration of the conventional detector (FIG. 1) is very narrow, such that the temperature of the air within the sensing chamber determines the amount of ionization that a given radiation source will provide, thus influencing ion velocity and direction, and hence its collectibility. In contrast, the auxiliary source shield 21 mounted to the bimetallic strip 19 when properly adjusted will maintain an optimum beam by an increased shielding of the radiation source with increased temperatures, from the setpoint temperature. Thus, an inexpensive mechanical compensator designed in accordance with this invention can convert the conventional detector from an unpredictable device over narrow temperature limits, to a very sensitive, stable device over a very broad temperature range. This is illustrated in FIG. 6.

In tests, measuring ionization chambers which had been modified and calibrated as described were exposed to chlorendic anhydride glycerol resin smoke in an oven (volume, 8 $ft.^3$) whose temperature was varied from 70° F to well over 150° F. In all cases the modified chambers indicated the presence of smoke within 4 to 7 seconds. In another such test a modified measuring chamber was maintained at elevated temperature for eight months; throughout that period the detector exhibited high sensitivity and good stability, firing promptly each time smoke was present without giving false alarms. In other tests, it was found that the modified chambers retained their sensitivity despite long periods of dormancy at elevated temperatures. Under the same conditions unmodified measuring chambers are subject to large decreases in sensitivity and to inoperability.

Figure 7:
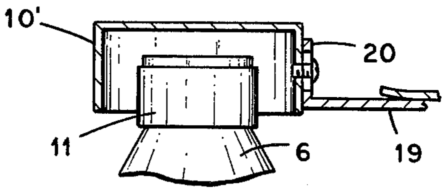
FIG. 7 is a schematic diagram of an aternative source cap arrangement designed in accordance with this invention.

It will be apparent to those versed in the art that various modifications in the arrangement shown in FIG. 2 can be made without departing from the scope of the invention as set forth in the appended claims. In FIG. 7, for example, a souce cap 10' is supported and positioned by the bimetallic arm 19; the cap 10' serves the purposes of both the aforementioned cap 10 and shield 21. The bimetallic arm 19 is formed with a right-angled, slotted tip 20 which is screwed to the cap, permitting initial manual adjustment of the cap relative to the source. In another alternative, the source cap 10 and shield 21 may both be in the form of rings, either of which is supported and positioned by a bimetallic strip. The shield 21 preferably is of circular configuration, but if desired can be of various other configurations, such as octagonal or rectangular. As viewed in cross section, it can be of any suitable shape.

What is claimed is:

1. In a system for detecting colloidally suspended particles in a gas, said system including a measuring ionization chamber which is open to said gas, said chamber having a pair of spaced electrodes for establishing an electric field therebetween, a source of radiation for ionizing molecules of said gas in said regions, and a first radiation shield positioned in partial overlap with said source for preventing part of said radiation from penetrating said region, the improvement comprising:

a second radiation shield mounted between said first shield and said region, and means responsive to changes in ambient temperature for supporting the second shield and moving the same relative to the first shield to offset temperature-induced variations in the sensitivity of said chamber.

2. The system of claim 1 wherein said source and the first and second shield are of generally circular configuration.

3. The system of clam 2 wherein said source and the first and second shield are coaxial.

4. The system of claim 1 wherein said means comprises a bimetallic strip.

5. The system of claim 4 wherein one end of said strip is affixed to the second shield, and the other end of said strip is affixed to said chamber.

6. In a system for detecting colloidally suspended particles in a gas, said system including a measuring ionization chamber which is open to said gas, said chamber having a pair of spaced electrodes for establishing an electric field in the region therebetween, an annular radiation source coaxially disposed within said chamber for ionizing molecules of said gas in said region to establish ionic current flow through an electric circuit connected across said electrodes, and alarm means actuated by a decrease in said ionic current flow, the improvement comprising:

an annular radiation shield extending about and in partial overlap with said source, and a bimetallic arm having an end connected to said shield for moving the same to vary the extent of said overlap inversely with changes in ambient temperature and thus stabilize said ionic current flow with respect to changes in said temperature.

7. The system of claim 6 wherein the other end of said arm in connected to said chamber.

8. The system of claim 7 wherein said other end of said arm is connected to said chamber by a member whose length is adjustable.

* * * * *